United States Patent
Strebel

(10) Patent No.: US 11,148,232 B2
(45) Date of Patent: Oct. 19, 2021

(54) LASER MACHINING SYSTEM AND LASER MACHINING METHOD

(71) Applicant: PRECITEC GMBH & CO. KG, Gaggenau (DE)

(72) Inventor: Matthias Strebel, Gaggenau (DE)

(73) Assignee: PRECITEC GMBH & CO. KG, Gaggenau (DE)

( * ) Notice: Subject to any disclaimer, the term of this patent is extended or adjusted under 35 U.S.C. 154(b) by 376 days.

(21) Appl. No.: 16/184,598

(22) Filed: Nov. 8, 2018

(65) Prior Publication Data

US 2019/0143458 A1 May 16, 2019

(30) Foreign Application Priority Data

Nov. 15, 2017 (DE) ..................... 10 2017 126 867.7

(51) Int. Cl.
*B23K 31/12* (2006.01)
*B23K 26/082* (2014.01)
(Continued)

(52) U.S. Cl.
CPC .......... *B23K 31/125* (2013.01); *B23K 26/032* (2013.01); *B23K 26/044* (2015.10);
(Continued)

(58) Field of Classification Search
CPC .. B23K 31/125; B23K 26/044; B23K 26/082; B23K 26/032; B23K 26/0643; B23K 26/0648; B23K 26/0652; B23K 26/067; B23K 26/28; B23K 26/04; B23K 26/21; B23K 26/03; B23K 26/06; B23K 31/12; B23K 26/042; B23K 26/00; B23K 26/08; B23K 26/10; B23K 26/20; G01B 9/02;
(Continued)

(56) References Cited

U.S. PATENT DOCUMENTS

| 5,045,668 A | 9/1991 | Neiheisel et al. |
| 6,909,799 B1 | 6/2005 | Wildmann et al. |

(Continued)

FOREIGN PATENT DOCUMENTS

| CA | 2210814 A1 | 1/1998 |
| CN | 1175687 A | 3/1998 |

(Continued)

OTHER PUBLICATIONS

PCT International Search Report and Written Opinion, PCT Application No. PCT/EP2018/078430, dated Feb. 12, 2019, 11 pages.
(Continued)

*Primary Examiner* — Phuong T Nguyen
*Assistant Examiner* — Yeong Juen Thong
(74) *Attorney, Agent, or Firm* — Fenwick & West LLP

(57) ABSTRACT

The invention pertains to a laser machining system includes first deflection optics, second deflection optics, and a coupling device. The first deflection optics deflect a machining laser beam in two directions in space. The second deflection optics deflect a measuring beam in two directions in space independently of the machining laser beam. The coupling device is arranged in a beam path of the machining laser beam and couples the measuring beam into the beam path of the machining laser beam.

8 Claims, 3 Drawing Sheets

(51) Int. Cl.
  *B23K 26/044* (2014.01)
  *B23K 26/03* (2006.01)
  *B23K 26/06* (2014.01)
  *B23K 26/067* (2006.01)
  *B23K 26/28* (2014.01)

(52) U.S. Cl.
  CPC ........ *B23K 26/067* (2013.01); *B23K 26/0643* (2013.01); *B23K 26/0648* (2013.01); *B23K 26/0652* (2013.01); *B23K 26/082* (2015.10); *B23K 26/28* (2013.01)

(58) Field of Classification Search
  CPC ......... G01B 9/06; G01B 11/22; G01B 11/30; G01B 11/14; G01B 5/00
  USPC ............ 219/121.64, 121.61, 121.65, 121.71, 219/121.73, 121.74, 121.75, 121.76, 219/121.77, 121.78, 121.84, 121.85; 356/237.1, 237.2, 601; 250/559.04; 382/141, 152; 348/90
  See application file for complete search history.

(56) References Cited

U.S. PATENT DOCUMENTS

| | | | | |
|---|---|---|---|---|
| 7,983,470 | B2 * | 7/2011 | Schwarz | G01B 11/25 382/141 |
| 8,450,639 | B2 | 5/2013 | Reitemeyer et al. | |
| 2001/0050273 | A1 | 12/2001 | Lefebvre et al. | |
| 2002/0084260 | A1 | 7/2002 | Kubota et al. | |
| 2006/0211158 | A1 * | 9/2006 | Arai | B23K 26/032 438/8 |
| 2010/0155375 | A1 | 6/2010 | Dietz et al. | |
| 2016/0039045 | A1 | 2/2016 | Webster | |
| 2016/0059347 | A1 * | 3/2016 | Kogel-Hollacher | B23K 26/046 219/121.74 |
| 2016/0356595 | A1 | 12/2016 | Lessmueller et al. | |
| 2019/0224781 | A1 * | 7/2019 | Yang | B23K 26/082 |

FOREIGN PATENT DOCUMENTS

| | | |
|---|---|---|
| CN | 1325779 A | 12/2001 |
| CN | 101646525 A | 2/2010 |
| CN | 101797663 A | 8/2010 |
| DE | 102009042986 B3 | 3/2011 |
| DE | 102009057209 B4 | 6/2012 |
| DE | 102010011253 B4 | 7/2013 |
| DE | 102014113283 B4 | 11/2016 |
| DE | 10 2016 001 661 B3 | 4/2017 |
| DE | 102016001661 B3 | 4/2017 |
| DE | 102015015112 A1 | 5/2017 |
| DE | 10 2015 015 330 A1 | 6/2017 |
| DE | 102015015330 A1 | 6/2017 |
| DE | 10 2016 106 648 A1 | 10/2017 |
| DE | 102016106648 A1 | 10/2017 |
| FI | 911787 A | 10/1991 |
| JP | H03-60887 A | 3/1991 |
| JP | 2016-000421 A | 1/2016 |
| JP | 2016-107318 A | 6/2016 |

OTHER PUBLICATIONS

China National Intellectual Property Administration, Office Action, CN Patent Application No. 201880073395.4, dated May 6, 2021, 13 pages.

Japan Patent Office, Office Action, JP Patent Application No. 2020-527022, dated Apr. 20, 2021, eight pages.

* cited by examiner

LASER MACHINING SYSTEM AND LASER MACHINING METHOD

CROSS-REFERENCE TO RELATED APPLICATION

This applications claims priority and benefit under 35 U.S.C. § 119(a) to German patent application no. No. 10 2017 126 867.7 filed on Nov. 15, 2017, which is incorporate by reference herein in its entirety.

BACKGROUND

In material machining by means of a laser beam such as laser welding or laser cutting, the laser beam emitted by a laser light source, e.g. the end of an optical fiber, is focused on the workpiece to be machined with the aid of beam guiding and focusing optics. In this context, it is standard practice to use a laser machining head with collimator optics and focusing optics, wherein the laser light is supplied via an optical fiber, which is also referred to as laser source. In a device for material machining by means of a laser, e.g. in a laser machining head, the laser light passes through a plurality of optical elements such as lenses.

In many welding processes, the point of impact of the machining laser beam has to very precisely coincide with the seam progression of the two parts to be joined in order to realize a stable process. This can be achieved by continuously determining the position of the seam during the welding process such that the laser can always be readjusted to this seam position with the aid of a scanner. However, most known technical solutions for determining the seam position during a welding process are based on the projection of laser lines on the component perpendicular to the seam progression and an evaluation of this laser line with the aid of a camera.

Such light-section methods have the disadvantage that the alignment of the laser line relative to the machining optics is permanently predefined and this method therefore only works in a predefined welding direction for a certain process. In other words, the determination of the seam progression is not directionally independent. One potential solution in light-section methods is the co-rotation of the entire optics in order to follow the seam progression, but this is only possible to a limited degree, namely even in robot-guided processes.

DE 10 2009 057 209 B4 describes a device for material machining by means of a laser with scanner optics that can be moved relative to the workpiece to be machined by means of a guiding machine. The device comprises a projector that serves for projecting measuring light in the form of measuring structures on the workpiece to be machined and an image sensor that is sensitive in the wavelength range of the measuring light emitted by the projector. The projector and the image sensor are connected to the scanner optics and consequently moved along with the scanner optics during the operation of the device. A directionally independent measurement is therefore not possible.

SUMMARY

The present invention is based on the objective of making available a laser machining system, particularly a system for material machining by means of a laser beam such as a laser machining head or a laser welding system, as well as a corresponding laser machining method, by means of which precise seam tracking can be realized independently of a machining direction.

This objective is attained with the objects of the independent claims. Advantageous embodiments are disclosed in the dependent claims.

Embodiments of the present invention concern a laser machining system. The laser machining system comprises first deflection optics, which are designed for deflecting a machining laser beam in two directions in space, second deflection optics, which are designed for deflecting a measuring beam in two directions in space independently of the machining laser beam, and a coupling device, which is arranged in a beam path of the machining laser beam and designed for coupling the measuring beam into the beam path of the machining laser beam.

The first deflection optics preferably comprise two independent first deflection mirrors. The first deflection optics are typically designed for a two-dimensional oscillation of the machining laser beam such as a motion along a line, preferably along a line perpendicular to the seam progression, a circular motion or a motion in the form of an "8."

The second deflection optics preferably comprise two independent second deflection mirrors. The second deflection optics are typically designed for a linear motion and/or a circular motion of the measuring beam.

The second deflection optics are preferably designed for moving the measuring beam on at least one workpiece, particularly on a joining region of two workpieces, independently of an advance direction of the machining laser beam.

The coupling device is preferably a beam splitter. The coupling device is typically designed for essentially superimposing the machining laser beam and the measuring beam coaxially.

The laser machining system preferably comprises a control unit, which is designed for controlling the first deflection device in such a way that the machining laser beam tracks a seam progression on the workpiece.

The laser machining system preferably comprises an evaluation unit, which is designed for measuring a seam progression such as an edge contour and/or a weld seam progression on the workpiece with the measuring beam. The evaluation unit can measure an edge contour of components to be joined in front of the machining laser beam and/or a weld seam progression behind the machining laser beam. In this context, the evaluation unit particularly may be designed for determining the seam progression by means of optical short-coherence tomography.

Another aspect of the present invention concerns a laser machining method. The method comprises a deflection of a machining laser beam in two directions in space such that the machining laser beam carries out a two-dimensional motion on at least one workpiece, a deflection of a measuring beam in two directions in space independently of the machining laser beam and the coupling of the measuring beam into a beam path of the machining laser beam.

The machining laser beam preferably carries out an oscillating motion (2D wobble process), e.g. in the form of a linear motion, a circular motion or a motion in the form of an "8."

The measuring beam preferably carries out a linear or circular motion on the seam progression such as on an edge contour and/or a weld seam progression.

The method preferably also comprises a determination of the seam progression, e.g. an edge contour of two workpieces to be joined, by means of the measuring beam, as well as tracking of the seam progression by the machining laser beam based on the determined seam progression. Optical short-coherence tomography is preferably used for determining the seam progression.

Preferred optional embodiments and special aspects of the invention can be gathered from the dependent claims, the drawings and the present description.

The presently described embodiments allow a directionally independent measurement of a seam progression on a component, as well as precise positioning of the laser beam on the determined seam position. An optical measuring beam is guided by a separate actuator system and coupled into the beam path of a machining laser downstream of its actuator system by means of a coupling device such that it is superimposed with the machining laser. This arrangement allows a quasi-coaxial measurement of the component geometry around the current position of the machining laser beam independently of the motion of the machining laser beam during the machining process.

Another advantage of the presently described embodiments for the seam detection in comparison with the line projection in light-section methods is the attainable resolution. The presently described embodiments provide an accuracy for the measured distance value of about 1 μm, particularly when optical coherence tomography is used. Vertical structures on the component such as the edge height of a fillet weld can be measured with this accuracy. The attainable resolution in a light-section method, in contrast, is primarily limited by the quality of the line projection. Typical line widths lie in the range of about 20 to 100 μm. The resolution of the structural detection, which is carried out by evaluating the lines on the camera images, is therefore lower by about one order of magnitude.

BRIEF DESCRIPTION OF THE DRAWINGS

Exemplary embodiments of the invention are illustrated in the figures and described in greater detail below. In these figures.

DETAILED DESCRIPTION

Unless stated otherwise, identical and identically acting elements are identified by the same reference symbols in the following description.

Figure 1:
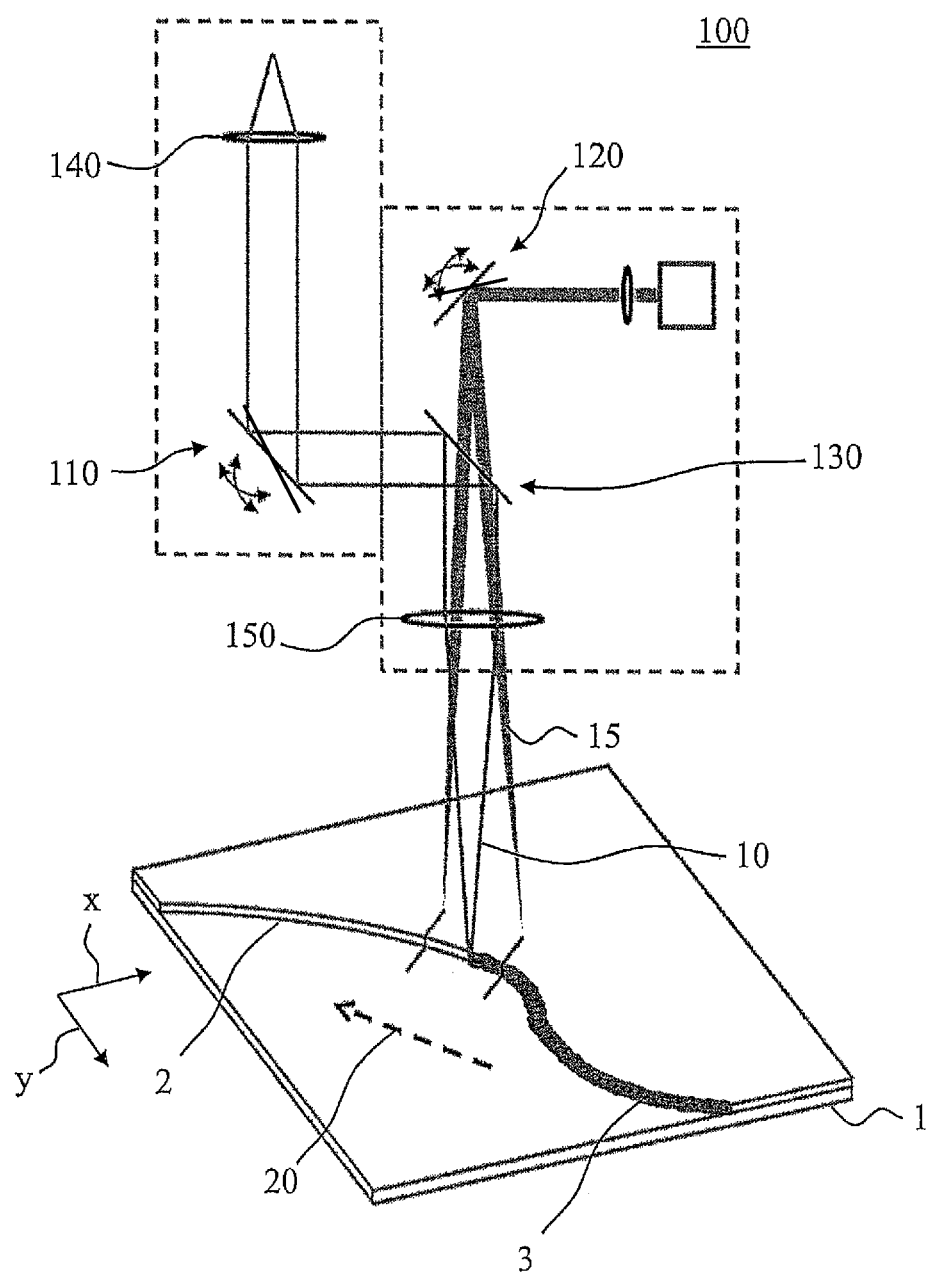
FIG. 1 schematically shows a laser machining system according to embodiments of the present invention, FIG. 2 schematically shows motions of a machining laser beam and a measuring beam according to embodiments of the present invention.

FIG. 1 shows a laser machining system 100, particularly a system for material machining by means of a laser beam such as laser cutting, according to embodiments of the present invention. The beam path of the machining laser is schematically illustrated in the left part of FIG. 1 and the beam path of the optical sensor system is illustrated on the right. According to embodiments, the optical sensor system may be a coherence interferometer.

The laser machining system 100 comprises first deflection optics 110, which are designed for deflecting a machining laser beam 10 in two directions in space x, y, second deflection optics 120, which are designed for deflecting a measuring beam 15 (sensor beam) in two directions in space x, y independently of the machining laser beam 10, and a coupling device 130, which is arranged in the beam path of the machining laser beam 10 and designed for coupling the measuring beam 15 into the beam path of the machining laser beam 10. The second deflection optics 120 are preferably designed for deflecting the measuring beam 15 on at least one workpiece 1, particularly on a joining region of two workpieces, independently of an advance direction or machining direction 20 of the machining laser beam 10.

According to embodiments of the present invention, a seam detection takes place, for example during welding of components, in order to precisely position the machining laser beam 10 relative to this seam. The measuring beam 15, which is deflected in two directions by the second deflection optics 120, makes it possible to determine the seam position independently of the current advance direction of a given machining process, e.g. a welding process. Due to a separate actuator system in the beam path of the machining laser beam, a laser beam oscillation in two directions ("2D wobble process") can be realized independently of the motion of the measuring beam 15 in the measuring beam path.

According to embodiments, the laser machining system 100 (also referred to as "laser machining head") comprises a (not-shown) laser source for making available a machining laser beam, e.g. an optical fiber, as well as collimator optics 140 that are designed for collimating the machining laser beam 10 and focusing optics 150 that are designed for focusing the machining laser beam 10 on at least one workpiece 1 or component.

The laser machining system 100 or parts thereof, e.g. a welding head, may according to embodiments be movable along the machining direction 20. The machining direction 20 may be a welding direction and/or a moving direction of the laser machining system 100, e.g. the welding head, relative to the workpiece 1. The machining direction 20 particularly may be a horizontal direction. The machining direction 20 may also be referred to as "advance direction" or "process direction."

In some embodiments, the laser machining system 100 is designed for welding processes. The laser machining system 10 can produce a weld seam on an individual workpiece or weld together two work pieces ("components to be joined") as illustrated in the example according to FIG. 1. The laser machining system 100 can measure a seam progression such as an edge contour 2 and/or a weld seam progression 3 on the workpiece 1 by means of the measuring beam 15. The edge contour 2 of components to be joined particularly can be measured in front of the machining laser beam 10 and/or the weld seam progression 3 can be measured behind the machining laser beam 10. In other words, the seam progression can be measured or determined by means of the measuring beam 15 upstream and/or downstream of the machining laser beam 10.

The laser machining system 100 preferably comprises an evaluation unit, which is designed for measuring a seam progression such as an edge contour 2 and/or a weld seam progression 3 on the workpiece with the measuring beam 15. The evaluation unit can measure or determine an edge contour of components to be joined in front of the machining laser beam 10 and/or a weld seam progression behind the machining laser beam 10 referred to the machining direction 20. The evaluation unit may be contained, for example, in an optical coherence tomograph and evaluate the reflected measuring beam in order to determine the seam progression.

The laser machining system 100 comprises a control unit, which is designed for controlling the first deflection device 110 in such a way that the machining laser beam 10 tracks the seam progression on the workpiece. The control unit may be connected to the evaluation unit and receive the data concerning the seam progression from the evaluation unit. Based on this data, the control unit can control the first deflection device 110 in such a way that the machining laser beam 10 tracks the seam progression on the workpiece.

The laser machining system 100 is designed for deflecting the machining laser beam 10 and the measuring beam 15 in two directions in space x, y. In other words, two degrees of freedom are made available for each of the two beams. The two directions in space x, y may be directions of the Cartesian coordinate system, e.g. the X-direction and the Y-direction. The two directions in space may extend orthogonal to one another and define a plane. The coordinate system may be defined with respect to the workpiece and particularly fixed or stationary with respect to the workpiece. Alternatively, the coordinate system may be defined with respect to the part of the laser machining system 100 that moves in the machining direction 20, e.g. the welding head, and particularly fixed or stationary with respect to the welding head.

The first deflection optics 110 preferably comprise at least one first deflection mirror, particularly two independent first deflection mirrors. The independent first deflection mirrors may be mounted so as to be rotatable about a respective rotational axis in order to deflect the machining laser beam 10 in the two directions in space. The rotational axes may extend perpendicular to one another and make available the two degrees of freedom, by means of which the machining laser beam 10 can be two-dimensionally deflected.

The laser optics therefore comprise an actuator system such as scanner optics consisting of two independent scanning mirrors, by means of which the machining laser beam 10 can be deflected in two directions on the component. In this way, the machining laser beam 10 can be precisely positioned on the component in two directions in space in order to track the seam progression during a welding process, e.g. a fillet weld.

According to embodiments, the first deflection optics 110 are designed for a two-dimensional oscillation of the machining laser beam 100. The machining laser beam 10 particularly can oscillate in two directions during the process in order to purposefully increase the area of influence of the machining laser beam 10 on the component and to thereby achieve a more stable weld connection. In such a 2D wobble process, the machining laser beam 10 can be moved on the component along a certain two-dimensional scanning figure, e.g. in the form of a line, a circle (FIG. 2(a)) or an 8 (FIGS. 2(b) and (c)). The oscillation typically takes place with a frequency in the range of about 50 to 1000 Hz, preferably with a frequency in the range of about 100 to 800 Hz.

Due to the high-frequency motion of the machining laser beam 10 along a two-dimensional figure, process variables such as laser speed, welding penetration depth and seam width can be purposefully adjusted by means of the amplitude and the frequency of the motion. For example, the area of influence of the laser can be increased for a given seam geometry by adapting the amplitude of the laser oscillation in order to thereby achieve an enhanced gap bridging ability. When a connection between two different materials such as copper and aluminum is produced, the mixing ratio in the molten mass furthermore can be purposefully adjusted by selecting the amplitude and the frequency accordingly.

In some embodiments, the second deflection optics 120 comprise at least one second deflection mirror, particularly two independent second deflection mirrors. The independent second deflection mirrors may be mounted so as to be rotatable about a respective rotational axis in order to deflect the measuring beam 15 in the two directions in space. The rotational axes may extend perpendicular to one another and make available the two degrees of freedom, by means of which the measuring beam 15 can be two-dimensionally deflected. The second deflection optics 120 are typically designed for a linear motion and/or a circular motion of the measuring beam as described in greater detail with reference to FIG. 2.

According to embodiments of the present invention, the coupling device 130 is a beam splitter. The coupling device 130 is typically designed for essentially superimposing the machining laser beam 10 and the measuring beam 15 coaxially. The coupling device 130 may be arranged upstream of the focusing optics 150 such that the machining laser beam 10 and the measuring beam 15 both pass through the focusing optics 150.

According to the described embodiments, the measuring light of the sensor system is coupled into the beam path of the machining laser, wherein the position of the measuring beam 15 on the component can be moved by means of a separate actuator system or scanner unit. The sensor principle for the distance measurement may be based, for example, on optical short-coherence interferometry (OCT). The coupling of the measuring beam 15 may be realized by means of a beam splitter, which is located in the beam path of the hot laser beam downstream of the actuator system of the machining laser. Due to this arrangement, a quasi-coaxial superposition of the measuring beam 15 and the machining laser beam 10 is achieved, wherein each of the two beams can be deflected in two directions independently of the other beam by means of a separate actuator system. One significant advantage can be seen in that the component geometry around the current position of the machining laser beam 10 can be measured with the measuring beam 15 independently of the motion of the machining laser beam 10 during the process.

For example, the measuring beam 15 initially may be repeatedly moved along a line that is located in front of the laser position referred to the welding direction in order to detect and adjust the precise position of the weld seam. Subsequently, the measuring beam 15 may be repeatedly moved, for example, along a line that is located behind the laser position referred to the welding direction in order to measure the seam geometry (see FIGS. 1 and 2(a) and (b)). Another possible motion of the measuring beam 15 on the component is the repeated motion along a circular figure, wherein a seam detection in front of the laser position and monitoring of the seam profile of the finished seam behind the laser position can thereby likewise be realized (see FIG. 2(c)).

In addition to the precise positioning of the laser beam on the seam progression of a connection, it may also be advantageous for the quality of the welding process, as well as the stability of the connection, if the laser beam carries out an oscillating motion, namely a so-called wobble process, around the previously determined seam position. For example, only the center of this oscillating motion may coincide with the seam position and the laser is moved around this center with high frequency. Depending on the seam geometry and the material of the components, this motion may take place along a linear path perpendicular to the seam or also along a predefined two-dimensional figure such as a circle or an 8. The presently described embodiments therefore make it possible to realize a high-frequency laser beam oscillation along a two-dimensional scanning figure, the position of which very precisely tracks the progression of a weld seam independently of the direction of this seam on the component.

Figure 2:
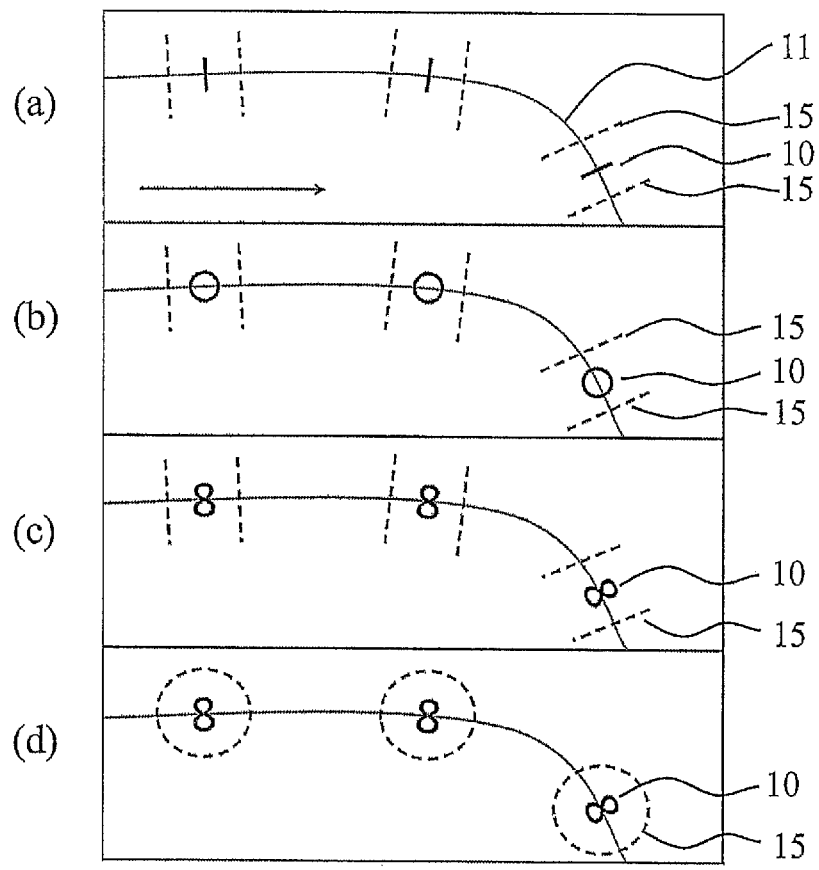

FIG. 2 schematically shows motions of a machining laser beam 10 and a measuring beam 15 according to embodiments of the present invention. This figure particularly shows different scanning figures of the measuring beam 15 for the seam detection and seam quality monitoring and the simultaneous high-frequency laser oscillation of the machining laser (2D wobble process). The arrow indicates the advance direction of the welding process along a curved seam progression 11. Three successive closed scanning figures for the measuring laser and the machining laser along the weld seam are respectively illustrated in this figure.

A height profile along the scanning figures can be generated due to the rapid scanning of the surface with the measuring beam 15. The position of the seam is obtained with the line in front of the laser beam and the height profile of the finished weld bead is obtained by scanning a line behind the laser beam. The machining laser beam 10 may simultaneously carry out a high-frequency, two-dimensional wobble process along a line that, for example, extends perpendicular to the seam progression (FIG. 2(*a*)). Another option for the scanning figure of the machining laser 10 is a circular figure or the shape of an 8 (FIGS. 2(*b*) and (*c*)). An alternative for the scanning figure of the measuring beam 15 is a circle that contains the seam detection area in front of the laser and the seam quality monitoring area behind the laser (FIG. 2(*d*)) just like the two lines upstream and downstream of the laser. The scanning figures of the measuring beam 15 and the scanning figures of the machining beam 10 naturally can be arbitrarily combined with one another. Shapes other than a circular line or a figure in the form of a circle or an 8 can also be used.

One advantage of a circular figure can be seen in that the actuator system for respectively deflecting the measuring beam 15 and the machining beam 10 has to carry out less abrupt decelerating and accelerating motions such that a higher repetition frequency of the figures can be achieved. A scanning figure for the machining beam 10 in the form of an 8 may be advantageous for the same reason. The specific requirements for a given process, e.g. the seam geometry, the precise seam progression or even the advance speed, may be decisive for whether a line scan or a circular scan is used.

Another advantage of scanning the measuring beam 15 along a circle can be seen in that the progression of the seam does not have to be known prior to the actual machining. The two lines upstream and downstream of the laser should always be aligned perpendicular to the seam for a measurement. For this purpose, the information on the seam progression can be forwarded to the activation software for the actuator system of the measuring beam such that the lines can always be aligned perpendicular to the current seam direction during the process. In a circular scan, such an alignment of the scanning figure is eliminated because a certain segment of the circle always extends perpendicular to the seam for each seam direction, namely in front of and behind the point of impact of the laser.

Figure 3:
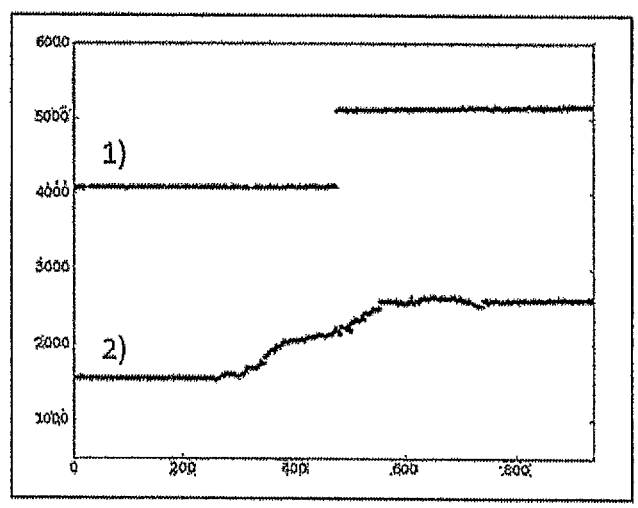
FIG. 3 shows measuring data of a line scan of an optical coherence tomograph.

FIG. 3 shows measuring data that was recorded with an optical short-coherence tomography (OCT) system for a fillet weld configuration in a line scan consisting of an upstream line and a downstream line. The data shown is OCT measuring data of a line scan by means of machining optics for welding processes while welding an aluminum fillet weld connection. The distance values of the OCT measurement is plotted in micrometers on the Y-axis and the position of the component is plotted (in any unit) on the X-axis. The height of the fillet weld, as well as its precise position, can be determined by means of the measuring data along the line in front of the laser (see FIG. 3 (1)). The profile of the completed seam and its quality can be monitored by means of the measuring data along the line behind the laser (see FIG. 3 (2)).

Figure 4:
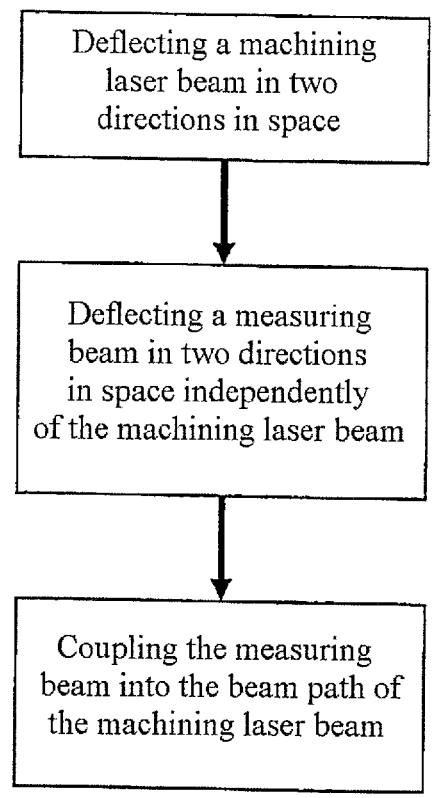
FIG. 4 shows a flow chart of a laser machining method according to embodiments of the present invention.

FIG. 4 shows a flow chart of a laser machining method according to embodiments of the present invention. The method may comprise the aspects described with reference to FIGS. 1-3.

The method comprises the deflection of a machining laser beam in two directions in space such that the machining laser beam carries out a two-dimensional motion on at least one workpiece, the deflection of a measuring beam in two directions in space independently of the machining laser beam and the coupling of the measuring beam into the beam path of the machining laser beam. The machining laser beam preferably carries out an oscillating motion ("2D wobble process"). The measuring beam can carry out a linear or circular motion along the seam progression such as an edge contour and/or a weld seam progression as illustrated, for example, in FIG. 2. The method typically also comprises a determination of the seam progression by means of the measuring beam, for example in front of the machining laser beam, as well as tracking of the seam progression by the machining laser beam based on the determined seam progression.

According to the presently described embodiments, two independent deflection optics are used for respectively deflecting the machining laser beam and the measuring beam two-dimensionally. The measuring beam is coupled into the beam path of the machining laser beam and essentially superimposed with the machining laser beam coaxially, for example, in order to carry out optical coherence tomography. In this way, directionally independent seam detection can be achieved, for example, in a 2D wobble process. The seam detection particularly can take place independently of a machining direction of the machining laser beam.

The invention claimed is:

1. A laser machining system, comprising:
   first deflection optics configured to adjust deflection of a machining laser beam from a laser source with two degrees of freedom such that the machining laser beam carries out a two-dimensional motion on at least one workpiece, the first deflection optics including at least one mirror, the first deflection optics configured for a two-dimensional oscillation of the machining laser beam;
   second deflection optics configured to adjust deflection of a measuring beam from an optical coherence interferometer with two degrees of freedom independently of the machining laser beam such that the measuring beam carries out a motion on the at least one workpiece, the optical coherence interferometer separate from the laser source, the second deflection optics designed for a linear or circular motion of the measuring beam; and
   a coupling device between the first deflection optics and the second deflection optics, the coupling device arranged in a beam path of the machining laser beam downstream of the first deflection optics and configured to couple the measuring beam into the beam path of the machining laser beam.

2. The laser machining system according to claim 1, wherein the first deflection optics comprise two independent first deflection mirrors mounted so as to be rotatable about a respective rotational axis in order to adjust deflection of the machining laser beam with the two degrees.

3. The laser machining system according to claim 1, wherein the second deflection optics comprise two independent second deflection mirrors mounted so as to be rotatable about a respective rotation axis in order to deflect the measuring beam in the two directions.

4. The laser machining system according to claim 1, wherein the second deflection optics are configured to deflect the measuring beam on the at least one workpiece independently of an advancing direction of the machining laser beam.

5. The laser machining system according to claim 1, wherein the coupling device is a beam splitter.

6. The laser machining system according to claim 1, wherein the coupling device is configured to superimpose the machining laser beam and the measuring beam coaxially.

7. The laser machining system according to claim 1, wherein the optical coherence interferometer is configured to determine a seam progression on a workpiece with the measuring beam.

8. The laser machining system according to claim 7, wherein the laser machining system is configured to control the first deflection optics in such a way that the machining laser beam tracks a seam progression on the workpiece.

\* \* \* \* \*